Figure 1A:
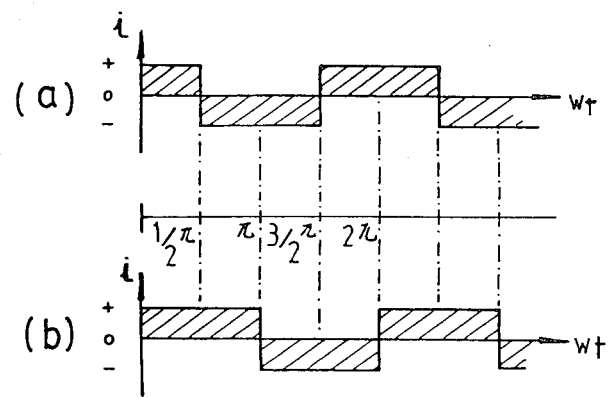

United States Patent [19]

Chung

[11] Patent Number: 4,472,664
[45] Date of Patent: Sep. 18, 1984

[54] CROSS-LINKED SWITCHING CIRCUIT FOR PRODUCING A TWO-PHASE CURRENT DRIVE FOR A BIPOLAR BRUSHLESS MOTOR AND A BRUSHLESS MOTOR INCLUDING SAID SWITCHING CIRCUIT

[76] Inventor: Yeong C. Chung, 34-76, Jisan-dong, Kwangju-shi, Jonranamdo, Rep. of Korea

[21] Appl. No.: 481,121

[22] Filed: Apr. 1, 1983

[51] Int. Cl.³ .............................................. G05B 1/06
[52] U.S. Cl. ...................................... 318/138; 315/681
[58] Field of Search ..... 318/345 CB, 345 B, 800-811, 318/254, 681, 244, 439, 721-723, 138; 363/132

[56] References Cited

U.S. PATENT DOCUMENTS

| | | | |
|---|---|---|---|
| 3,525,883 | 8/1970 | Iordanidis | 318/681 |
| 3,806,789 | 4/1974 | Cap et al. | 318/681 |
| 3,855,510 | 12/1974 | Houck | 318/722 |
| 4,066,945 | 1/1978 | Korte, Jr. | 318/681 |
| 4,357,569 | 11/1982 | Iwakane et al. | 318/721 |

OTHER PUBLICATIONS

"Solid-State Dpdt Switch" by Don Dekold, In Electronics, Feb. 1, 1973, p. 100.

Primary Examiner—J. V. Truhe
Assistant Examiner—A. Evans
Attorney, Agent, or Firm—Jones, Tullar & Cooper

[57] ABSTRACT

A switching circuit for producing a current drive for a bipolar brushless motor in solid-state form comprising cross-linked switching transistors which are controlled by control transistors which in turn are controlled by a decoder. The decoder may have provided as input signals either signals derived from the rotation in the motor in which case it acts as an asynchronous motor or may be controlled by signals from a counter which receives input pulses in which case the motor will rotate to accordance with the input pulses.

11 Claims, 15 Drawing Figures

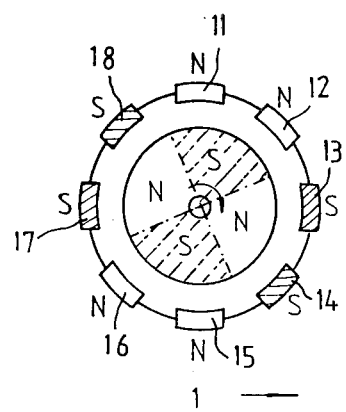
Fig. 3(A)
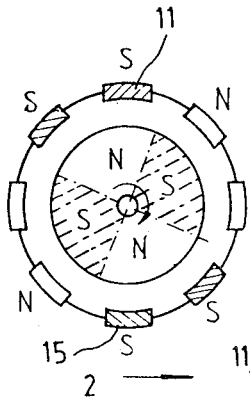
Fig. 3(B)
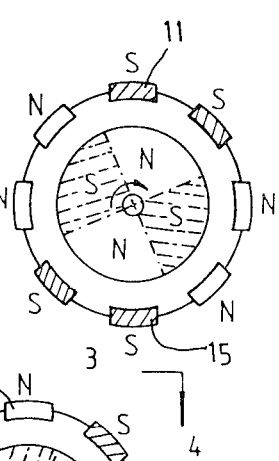
Fig. 3(C)
Fig. 3(D)
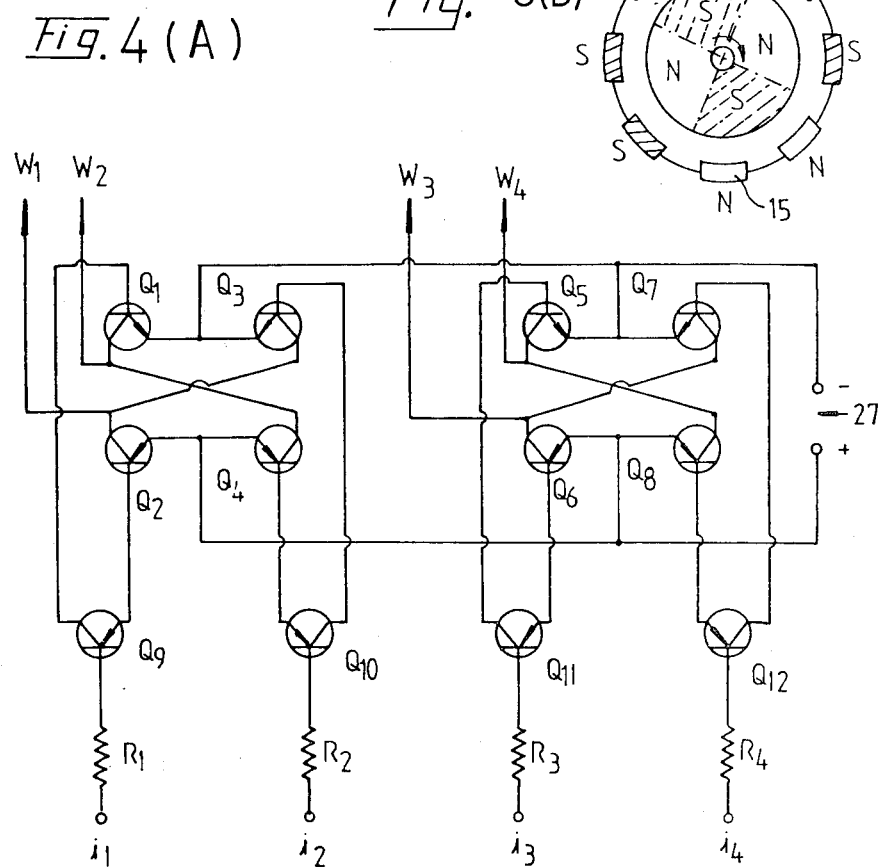
Fig. 4(A)

TABLE 4

| STEP \ INPUT (IC$_2$) | D$_1$ | D$_2$ |
|---|---|---|
| 1 | 0 | 0 |
| 2 | 0 | 1 |
| 3 | 1 | 0 |
| 4 | 1 | 1 |

TABLE 5

| | POSITION OF ROTOR | | DETECTION CODE | |
|---|---|---|---|---|
| | A$_1$ | B$_1$ | A$_1$ | B$_1$ |
| 1 | 0 | 0 | 1 | 1 |
| 2 | 0 | 1 | 0 | 0 |
| 3 | 1 | 0 | 0 | 1 |
| 4 | 1 | 1 | 1 | 0 |

TABLE 1
| STEP | T.R | | | | OUTPUT POLARITY OF DRIVE CIRCUIT | | | |
|---|---|---|---|---|---|---|---|---|
| | $Q_9$ | $Q_{10}$ | $Q_{11}$ | $Q_{12}$ | $W_1$ | $W_2$ | $W_3$ | $W_4$ |
| 1 | ON | OFF | ON | OFF | + | − | + | − |
| 2 | ON | OFF | OFF | ON | + | − | − | + |
| 3 | OFF | ON | OFF | ON | − | + | − | + |
| 4 | OFF | ON | ON | OFF | − | + | + | − |
TABLE 2
| STEP | INPUT $i_1$ | $i_2$ | $i_3$ | $i_4$ |
|---|---|---|---|---|
| 1 | 0 | 1 | 0 | 1 |
| 2 | 0 | 1 | 1 | 0 |
| 3 | 1 | 0 | 1 | 0 |
| 4 | 1 | 0 | 0 | 1 |
TABLE 3
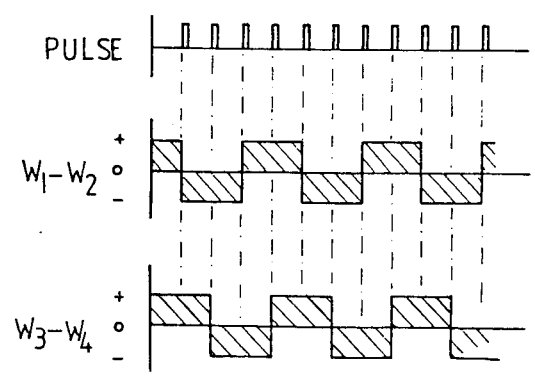

CROSS-LINKED SWITCHING CIRCUIT FOR PRODUCING A TWO-PHASE CURRENT DRIVE FOR A BIPOLAR BRUSHLESS MOTOR AND A BRUSHLESS MOTOR INCLUDING SAID SWITCHING CIRCUIT

The present invention relates to a cross-linked switching circuit for producing a two-phase current drive for a bipolar brushless motor and a brushless motor including said switching circuit.

The present invention provides a switching circuit for producing a two-phase current drive for a bipolar brushless motor comprising four output lines, two sets of four cross-linked switching transistors connected to switch a power supply to the four output lines, a respective two of the switching transistors being connected to each output line and a respective two of the switching transistors being controlled by each respective control transistor.

Figure 1B:
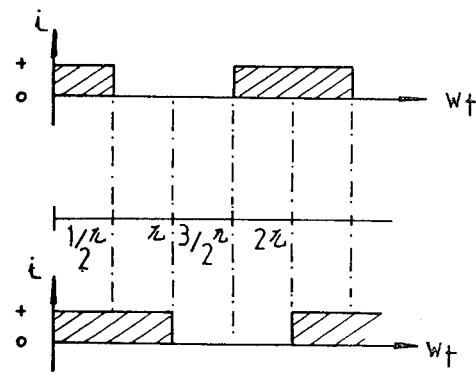
Figure 2:
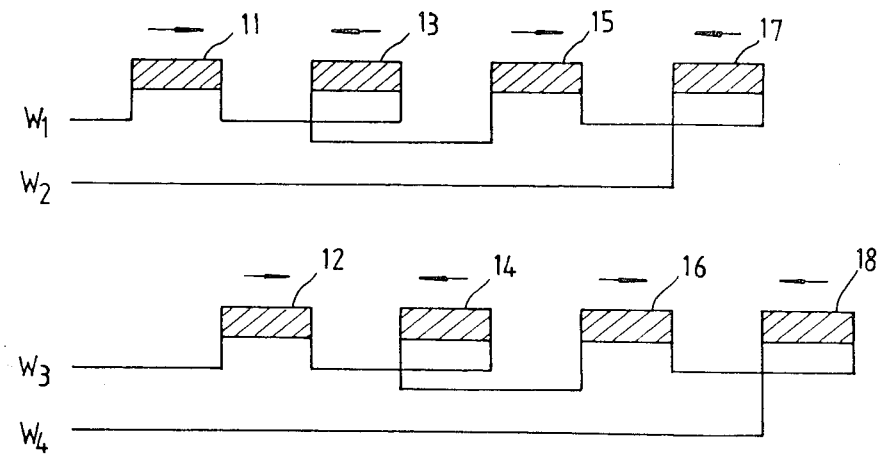
Figure 2:
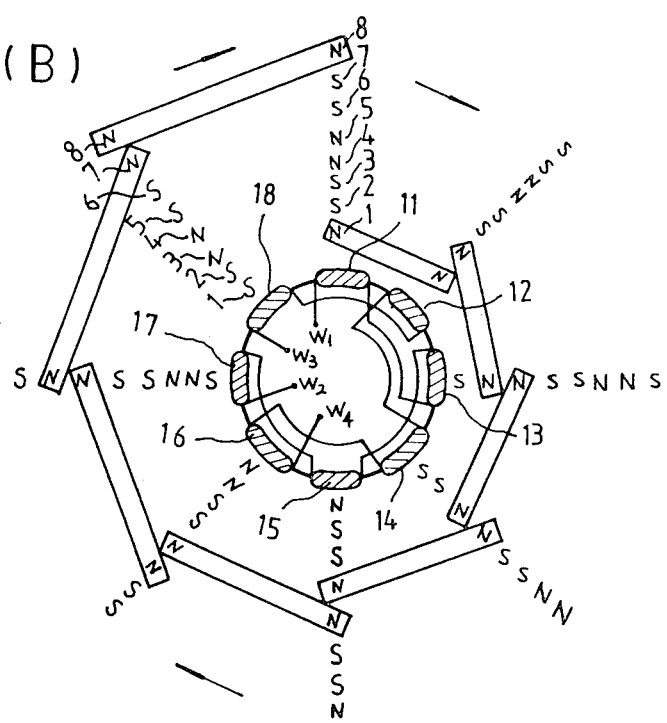
Figure 4:
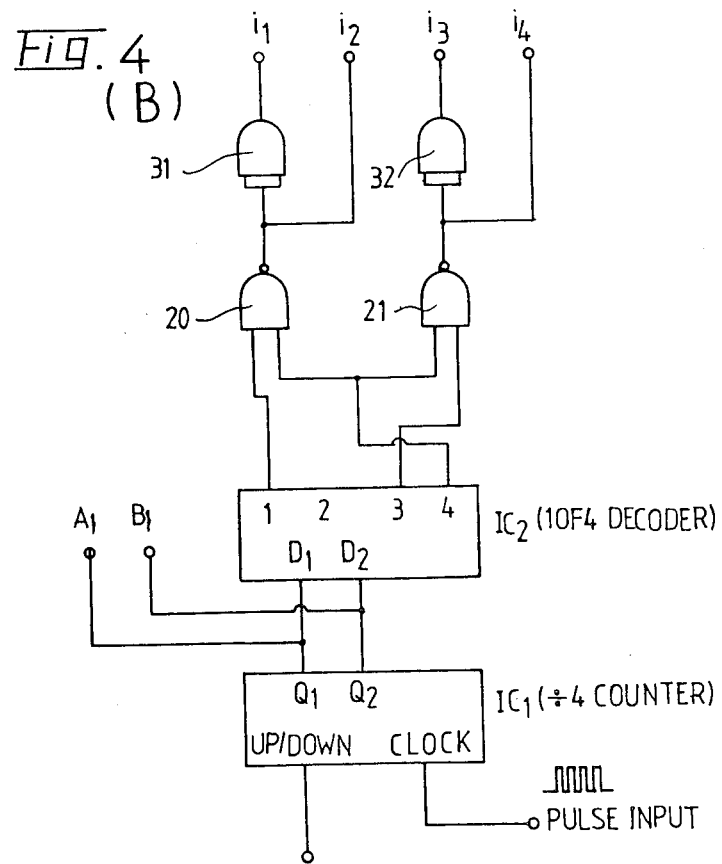
Figure 5:
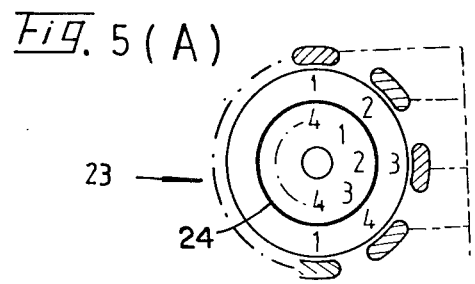
Figure 5:
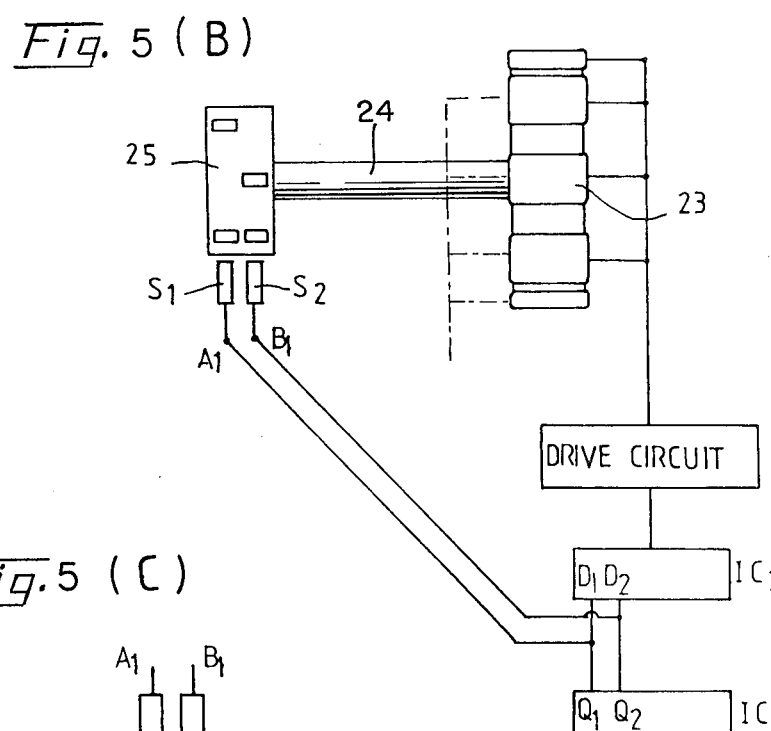
Figure 5:
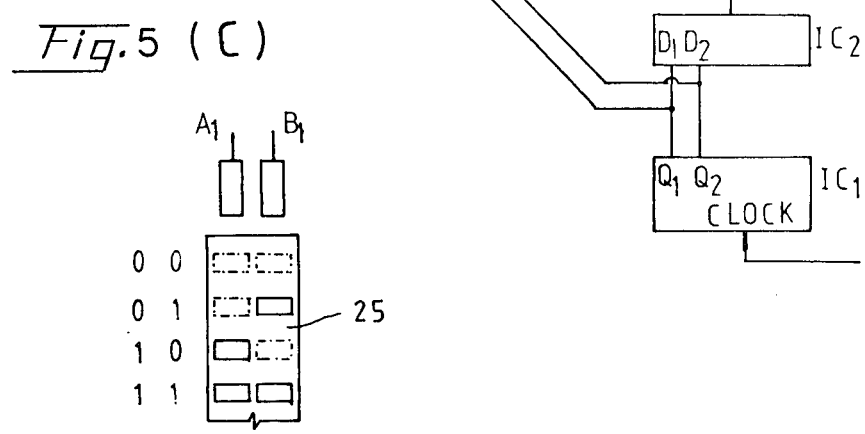

A preferred embodiment of the invention will now be described by way of example and with reference to the accompanying drawings in which:

FIGS. 1 (A) and (B) show the waveforms for bipolar two-phase and unipolar two-phase currents motors, FIGS. 2 (A) and (B) show the arrangement of two-phase field windings for a bipolar two-phase motor in diagramatic form and the rotating magnetic field when excited by two-phase currents, FIG. 3 shows in diagrammatic form a transverse section of a bipolar two-phase motor at various points in a cycle, FIGS. 4 (A) and (B) show, in diagrammatic form, a cross-linked switching circuit for producing a current drive for a bipolar motor in accordance with the invention, FIGS. 5 (A), (B) and (C) show in diagrammatic form, an arrangement for driving the motor asynchronously in a closed-loop.

Tables 1 thru Table 5 show the relationship of variables of the motor control show in FIGS. 1–5.

This invention is concerned with a brushless DC motor. Conventional drive systems for brushless DC motors and stepping motors, using an unipolar drive circuit producing current waveforms of the type shown in FIG. 1 (B) in which the current flows in only one direction, are simple and economical. But the disadvantages of this unipolar drive circuit are the low efficiency of its field winding, wide fluctuation and associated hunt, and slow response time. In addition, multiphase excitation current is required.

However, current waveforms of the type shown in FIG. 1 (A) produced by a bipolar drive circuit in which the current flow in the windings are bidirectional, provides windings of high efficiency and with good performance characteristics. To achieve these driving characteristics, sophisticated drive systems are necessary.

In this specification an economical switching circuit and associated control logic circuit which produces the current characteristics of FIG. 1 (B) having a high degree of performance are described which make it possible to produce both an asynchronous motor drive in a closed-loop control system and a synchronous drive in an open-loop control system with self-starting. Therefore, complex control which was impossible in a conventional motor drive can be accomplished in a two-phase brushless motor.

Two-phase windings 11 to 18 are shown diagrammatically in FIG. 2 (A) and are arranged in sequence (1)–(8) around the rotor as shown in FIG. 2 (B). The relative direction of windings in each case is indicated in FIG. 2 (A) by the arrows. Thus if, for example, winding 11 is wound clockwise, then so are windings 12, 15 and 16 and windings 13, 14, 17 and 18 are anti-clockwise. Note, however that, windings 11, 13, 15 and 17 are connected between wires $W_1$, $W_2$ and windings 12, 14, 16, and 18 are connected between wires $W_3$, $W_4$ and so the two sets of windings 11, 13, 15, 17 and 12, 14, 16, 18 can be separately excited by currents of a different phase. When two-phase currents are supplied to the wires $W_1$, $W_2$, $W_3$, $W_4$ of this bipolar drive system, in a switching sequence to be later described, an 8-pole rotating magnetic field is induced with 8 steps (1–8) as shown in FIG. 2 (B).

Generally, the number of poles in a motor with two-phase field coils is given by 2N(2, 4, 6, 8, ...). The number of poles in field and in rotor driven by bipolar two-phase currents in this invention is a little different. In other words, with respect to the field coil the number of poles becomes $Ps = 2 \times 2N$ and with respect to the rotor coil the number of poles becomes $Pr = 2N$.

The rotating sequence of a 4-pole rotor in synchronism with the 8-pole field coil is depicted in FIG. 3. It is always effective, independent of the alternating phase in the bipolar two-phase current. As shown in FIG. 3, one rotation of 4-pole rotor results from 8 steps of 45° per step. The top graph (a) of FIG. 1 (A) shows the direction of current through windings 11, 13, 15, 17 when controlled by a drive circuit and control logic circuit to be described and is also of course a graph of the difference ($W_1 - W_2$) of potential between wires $W_1$, $W_2$. Similarly the bottom graph (b) of FIG. 1 (A) shows the direction of current through windings 12, 14, 16, 18 which is also the difference ($W_3 - W_4$) of potential between wires $W_3$, $W_4$. Such waveforms produce a rotating magnetic field whose angle is indicated on the graph.

The drive circuit and the control logic circuit for obtaining the rotating field are illustrated in FIG. 4 and described as follows.

As shown in FIG. 4 (A), a switching amplifier circuit comprises power supply 27 switching transistors $Q_1$ to $Q_4$ and $Q_5$ to $Q_8$, transistors $Q_1$ to $Q_4$ being cross-coupled and transistors $Q_5$ to $Q_8$ being cross-coupled as shown. In order to switch transistors $Q_1$ to $Q_8$, the collector and emitter of a control transistor $Q_9$ are connected to the base of switching transistors $Q_1$, $Q_2$, those of a control transistor $Q_{10}$ to that of switching transistors $Q_3$, $Q_4$, those of control transistor $Q_{11}$ to that of switching transistors $Q_5$, $Q_6$, and those of a control transistor $Q_{12}$ to that of switching transistors $Q_7$, $Q_8$, respectively.

If one pair of transistors $Q_1$, $Q_2$ and transistors $Q_3$, $Q_4$ is turned on or off, the polarity of the output between wires $W_1$ and $W_2$ is changed, and the polarity of the output between wires $W_3$, $W_4$ is changed if any pair of transistors $Q_5$, $Q_6$ and $Q_7$, $Q_8$ is turned on or off. So if we cause transistors $Q_1$ to $Q_4$ and $Q_5$ to $Q_8$ to operate as independent bipolar switches and turn them on or off at the appropriate time, we can produce two-phase current which has phase difference of 90°.

First of all, when transistor $Q_9$ is turned on, transistors $Q_1$ and $Q_2$ are turned on such that wires $W_1$ and $W_2$ become +, − respectively; at this time transistor $Q_{10}$ should be turned off. Next when transistor $Q_9$ is turned off while transistor Q$_{10}$ is turned on, transistors Q$_3$ and Q$_4$ are turned on such that wires W$_1$ and W$_2$ become —, +, respectively.

As above, wires W$_1$ and W$_2$ can carry out bipolar drive according to the switching operation of control transistors Q$_{10}$, Q$_9$. Wires W$_3$ and W$_4$ can also carry out bipolar drive according to the switching operation of control transistors Q$_{11}$, Q$_{12}$.

In order to produce bipolar two-phase current, if we turn on or off transistors Q$_9$ to Q$_{12}$ in the order as shown in Table 1, we can obtain the two-phase current which is shown in FIG. 1 (B). Control transistors Q$_9$ to Q$_{12}$ controlled by control current signals i$_1$ to i$_4$ respectively and Table 2 shows the binary logic signal representing the electric signals i$_1$ to i$_4$ which flow to the bases of transistors Q$_9$ to Q$_{12}$.

In Table 2, signal 0 stands for the turning on of transistors Q$_9$ to Q$_{12}$ and signal 1 stands for the turning off of transistors Q$_9$ to Q$_{12}$ and shows the sequence of signals i$_1$ to i$_4$ required for each step.

FIG. 4 (B) shows a drive logic circuit which supplies the signals i$_1$ to i$_4$. A divide-by-4 counter IC$_1$ and a 1 of 4 decoder IC$_2$ carry out 2-bit binary ring counting. In order to produce the same outputs in the sequence shown in Table 2, NAND gates 20, 21 are connected to the outputs of the 1 of 4 decoder IC$_2$, the output of NAND gate 20 is connected to control transistor Q$_9$ via an inverter 31 and resistor R$_1$ (see FIG. 4 (A)) and to control transistor Q$_{10}$ via resistor R$_2$ and the output of NAND gate 21 is connected to control transistor Q$_{11}$ via an inverter 32 and resistor R$_3$ and to control transistor Q$_{12}$ via resistor R$_4$.

When the output terminal (1) of decoder IC$_2$ becomes 0 and the output terminals (2), (3), (4) of decoder IC$_2$ become 1, i$_1$=0, i$_2$=1, i$_3$=1, i$_4$=0. When the output terminal (2) of decoder IC$_2$ becomes 0 and the output terminals (1), (3), (4) of decoder IC$_2$ become 1, i$_1$=1, i$_2$=0, i$_3$=1, i$_4$=0. When the output terminal (3) of decoder IC$_2$ becomes 0 and the output terminals (1), (2), (4) of decoder IC$_2$ become 1, i$_1$=1, i$_2$=0, i$_3$=0, i$_4$=1. When the output terminal (4) of decoder IC$_2$ becomes 0 and the output terminals (1), (2), (3) of decoder IC$_2$ become 1, i$_1$=0, i$_2$=1, i$_3$=0, i$_4$=1.

During these four steps, the outputs i$_1$ to i$_4$ are applied to the bases of control transistors Q$_9$ to Q$_{12}$ and the switching operation of Table 1 is carried out and two-phase current of FIG. 1 can be obtained by the switching of switching transistors Q$_1$ to Q$_8$.

The relation between input pulses of divide-by-4 counter IC$_1$ in the drive logic circuit and two-phase current obtained from W$_1$ to W$_4$ in drive circuit is illustrated in Table 3. The relation between the input pulses to counter IC$_1$ and the output signals at inputs D$_1$, D$_2$ of IC$_2$ are shown in FIG. 4.

Because the speed of counting varies according to the frequency of the input pulses to counter IC$_1$ and the frequency of the two-phase current in wires W$_1$ to W$_4$ is also thereby varied, counter IC$_1$ controls the speed of revolution of the motor. Also because the counting sequence of the counter IC$_1$ can be changed by an up-/down control signal applied to counter IC$_1$, the direction of revolution of the motor can also be changed. When there is no input pulse, the motor stops rotating with a damping factor as much as revolution torque. Therefore, when the pulses are fed to the inputs of counter IC$_1$, stepping control is made by the frequency control in open loop.

Now, the relation between rotating angle and the number of poles can be expressed as $$D = (2\pi/Ps) \quad (1)$$

D: rotating angle per a step
Ps: number of poles in field winding.

If the 2-bit counting signal is applied to the inputs D$_1$, D$_2$ of decoder IC$_2$ as described in Table 4 the outputs of i$_1$ to i$_4$ in Table 2 are obtained and two-phase currents flow in wires W$_1$ to W$_4$, as counter IC$_1$ counts the input pulses.

If 2-bit counting signals according to the position of a rotor are fed back to D$_1$, D$_2$ then a closed loop speed control is provided. This principle is explained as follows according to FIG. 5.

2-bit binary counting data are marked on the surface of a position indicating binary coded cylinder 25 attached to rotate with the rotor 24 of the motor 23. The binary codes should lead the position of the rotor pole by one step. With sensors (S$_1$, S$_2$) connected to leads A$_1$, B$_1$, the counting data, which always leads the rotating field by 1 step, is applied to inputs D$_1$, D$_2$ of decoder IC$_2$.

When that data signal is applied to the input terminals of D$_1$, D$_2$, the bipolar two-phase current which leads by one step is applied to the field winding through wires W$_1$ to W$_4$. Then torque is established because of the leading rotating field.

In order that 4 step data applied to D$_1$, D$_2$ in FIG. 4 (B) may lead the position of the rotor synchronized with field winding by 1 step, the marks (binary coded signal) on the position indicating binary coded cylinder 25 are arranged such that the marks lead the position of the rotor by 1 step. Then, because signals from the sensors A$_1$, B$_1$, always lead the position of the synchronized rotor, closed loop asynchronous motor drive is provided.

Since the drive circuit and its logic circuit are composed of semiconductors and resistors, they can be integrated into a single chip and can easily be mass produced.

Consequently, since a two-phase motor composed of the stator with 2×2N poles and a rotor with half the number of the stator poles can be driven by bipolar two-phase current, we can obtain a high efficiency of excitation of the winding, large torque with small volume, and speed control not only by sychronous drive with open loop control but also asynchronous drive with closed loop control. When we control small power as well as servo, we can provide a brushless DC motor which can put various control abilities into operation.

I claim:

1. A switching circuit for producing from a single d.c. power source a two-phase current drive for a bipolar brushless motor, comprising:
   a d.c. power supply;
   first and second bridge circuits connected across said power supply, each bridge circuit including:
   first and second switching transistors forming a first pair;
   third and fourth switching transistors forming a second pair;
   a first control transistor connected across the bases of said first pair of transistors;
   a second control transistor connected across the bases of said second pair of transistors;

said first and fourth switching transistors being cross-coupled and connected to a first power output line; and said second and third control transistors being cross-coupled and connected to a second power output line;

the first and second power output lines for said first bridge circuit providing a first drive current and the first and second power output lines for said second bridge circuit providing a second drive current for a two-phase bipolar motor.

2. A switching circuit as claimed in claim 1, further including means for activating said first and second control transistors for each said bridge circuit to produce first and second drive currents having a predetermined phase difference.

3. A switching circuit as claimed in claim 1, wherein said first and second control transistors for each of said bridge circuits are so connected to corresponding first and second pairs that when said first control transistor is conductive and said second control transistor is non-conductive, the drive current provided at said first and second power output lines has a first polarity, and when the conductivity of said first and second control transistors is reversed, the drive current provided at said first and second power output lines is reversed.

4. A switching circuit as claimed in claim 3, further including means for activating said first and second control transistors for each said bridge circuit to produce first and second drive currents having a phase difference of 90°.

5. A switching circuit as claimed in claim 1, wherein in each of said first and second bridge circuits said first and third switching transistors are connected emitter to emitter, said first and third switching transistor emitters being connected to one side of said d.c. power supply;

said second and fourth switching transistors are connected emitter to emitter, said second and fourth switching transistor emitters being connected to the other side of said d.c. power supply;

said cross-coupled first and fourth switching transistors are connected directly to each other collector to collector, said first and fourth switching transistor collectors being connected to said first power output line; and wherein said cross-coupled second and third switching transistors are connected directly to each other collector to collector, said second and third switching transistor collectors being connected to said second power output line.

6. A switching circuit as claimed in claim 5, further including:

a bipolar motor having first and second sets of windings, said first and second power output lines for said first bridge circuit being connected to said first set of windings, and said first and second power output lines for said second bridge circuit being connected to said second set of windings.

7. A switching circuit as claimed in claim 6, in which said first and second control transistors for each of said first and second bridge circuits are controlled by a drive logic circuit including:

a decoder having input and output lines;
a counter connected to said decoder input lines;
first and second NAND gates connected to selected decoder output lines; and
means connecting the outputs of said NAND gates to corresponding said control transistors.

8. A switching circuit as claimed in claim 7, further including:

means responsive to the rotation of said motor to produce decoder control signals and to feed said decoder control signals to the input lines of said decoder to provide asynchronous drive of said motor with a closed loop.

9. A switching circuit as claimed in claim 1 in which said first and second control transistors for each of said first and second bridge circuits are controlled by a drive logic circuit including:

a first counter means connected to drive a decoder means having output lines;
first and second NAND gates each having an output;
said output lines of the decoder being connected to said NAND gates;
first and second inverters; and
means connecting the outputs of said first and second NAND gates through said first and second inverters, respectively, to the first control transistors of said bridge circuits, and connecting the outputs of said first and second NAND gates to the second control transistors of said bridge circuits.

10. A switching circuit as claimed in claim 9 further including:

a bipolar motor drivingly connected to the power output lines of said first and second bridge circuits;
means responsive to the rotation of said motor to produce decoder control signals and to feed said decoder control signals derived from rotation of said motor to the input of the decoder means so as to provide asynchronous drive of said motor with a closed loop.

11. A switching circuit as claimed in claim 10 wherein said means responsive to the rotation of said motor comprises a cylinder carrying a binary code mounted to rotate with the rotor of said motor, and sensors to sense rotation of said cylinder, said sensors being connected to the input of the decoder means, and the codes being detected by the sensors to detect the position of the rotor.

* * * * *